US010908623B2

(12) United States Patent
Peace (10) Patent No.: US 10,908,623 B2
(45) Date of Patent: Feb. 2, 2021

(54) REMOTE GAS REGULATING AND CONTROL SYSTEMS AND RELATED DEVICES

(71) Applicant: Sensus Spectrum, LLC, Morrisville, NC (US)

(72) Inventor: Daniel W. Peace, Punxsatawney, PA (US)

(73) Assignee: Sensus Spectrum, LLC, Morrisville, NC (US)

( * ) Notice: Subject to any disclaimer, the term of this patent is extended or adjusted under 35 U.S.C. 154(b) by 14 days.

(21) Appl. No.: 16/378,793

(22) Filed: Apr. 9, 2019

(65) Prior Publication Data

US 2020/0064872 A1 Feb. 27, 2020

Related U.S. Application Data

(60) Provisional application No. 62/723,109, filed on Aug. 27, 2018.

(51) Int. Cl.
*F16K 31/14* (2006.01)
*G05D 7/06* (2006.01)
*F16K 31/126* (2006.01)

(52) U.S. Cl.
CPC ......... *G05D 7/0635* (2013.01); *F16K 31/126* (2013.01); *Y10T 137/261* (2015.04); *Y10T 137/7782* (2015.04); *Y10T 137/7831* (2015.04)

(58) Field of Classification Search
CPC ........... Y10T 137/7782; Y10T 137/783; Y10T 137/7831
See application file for complete search history.

(56) References Cited

U.S. PATENT DOCUMENTS

| 3,856,042 A * | 12/1974 | Fletcher | F16K 17/0486 137/505.42 |
| 6,994,309 B2 * | 2/2006 | Fernandez-Sein | F16K 37/0091 251/129.04 |
| 8,336,851 B2 * | 12/2012 | Wykle | G05D 16/0683 137/495 |

(Continued)

FOREIGN PATENT DOCUMENTS

WO    WO 2015/128690 A1    9/2015

OTHER PUBLICATIONS

Notification of Transmittal of the International Search Report and the Written Opinion of the International Searching Authority, or the Declaration. PCT/US019/047005, dated Nov. 5, 2019, 13 pages.

*Primary Examiner* — Robert K Arundale
(74) *Attorney, Agent, or Firm* — Stanek Lemon Crouse & Meeks PA (57) ABSTRACT

A gas regulating and control system is provided that is configured to be received at a gas regulator installed at a remote location for remotely controlling the gas flow, the system including a gas control module including a plurality of sensors associated with the gas regulator, the plurality of sensors configured to sense a corresponding plurality of parameters associated with the gas regulator. The gas control module is configured to automatically turn off the gas to the gas regulator when one or more of the corresponding plurality sensed parameters is determined to be outside an acceptable range for the sensed parameter.

13 Claims, 11 Drawing Sheets

(56) References Cited

U.S. PATENT DOCUMENTS

| | | | |
|---|---|---|---|
| 2008/0290986 A1* | 11/2008 | Laughlin-Parker | G05B 9/02 340/3.8 |
| 2011/0192999 A1 | 8/2011 | Wykle | |
| 2013/0092259 A1 | 4/2013 | Griffin, Jr. et al. | |
| 2018/0045375 A1 | 2/2018 | N et al. | |
| 2019/0093785 A1* | 3/2019 | Heinrich | F16K 24/04 |

* cited by examiner

REMOTE GAS REGULATING AND CONTROL SYSTEMS AND RELATED DEVICES

CLAIM OF PRIORITY

The present application claims priority from U.S. Provisional Application No. 62/723,109, filed on Aug. 27, 2018 entitled Remote Gas Regulating System and Related Devices, the content of which is hereby incorporated herein by reference as if set forth in its entirety.

FIELD

The present inventive concept relates generally to pressure and flow regulators and, more particularly, to gas regulators capable of being controlled remotely for gas flow.

BACKGROUND

Utilities are not generally in the business of disconnecting service. However, each year utilities, such as gas companies, dispatch thousands of orders to shut off service for a variety of reasons, for example, safety, move outs or collections activities. Thus, remote gas shutoff capability at or near the point of end use (customer location) is a desired feature for service supply utilities. Remote shut off provides both enhanced safety as well as deterrence of non-payment. For example, upon notice of a dangerous condition or non-payment by the customer, service can be shut off remotely. Thus, a technician does not have to be subjected to, for example, dangerous conditions, gas leaks, unhappy customer(s), protective pets and the like. Conventional shutoff devices generally require modification of the service supply piping for a standalone shutoff or changing-out the regulator or meter to another with an integral shutoff. Neither having to break into the existing piping nor installing a brand new regulator or meter is desirable or cost effective.

SUMMARY

Some embodiments of the present inventive concept provide a gas shut-off system configured to be received at a gas regulator installed at a remote location for remotely controlling the gas flow. The system includes a gas control module including a plurality of sensors associated with the gas regulator, the plurality of sensors configured to sense a corresponding plurality of parameters associated with the gas regulator. The gas control module is configured to automatically turn off the gas within the gas regulator when one or more of the corresponding plurality sensed parameters is determined to be outside an acceptable range for the sensed parameter.

In further embodiments, the gas control module may further include a communications circuit configured to transmit signals to and receive signals from a remote location. The gas control module may be further configured to shut off the gas within the gas regulator responsive to a shut off signal from the remote location.

In still further embodiments, the gas control module may be further configured to turn on the gas to the home or end-user-responsive to a turn on signal from the remote location.

In some embodiments, the corresponding plurality of sensed parameters may include pressure inside a pipe, supply pressure, delivery pressure, temperature, vibrations and any combination thereof.

In further embodiments, the gas control module may be further configured to determine if one or more of the corresponding plurality of sensed parameters is outside the acceptable range for the sensed parameter and if it is determined that the one or more parameters is outside the acceptable range, use pressure stored in a carbon dioxide cylinder to fill a bladder and actuate a lever assembly of the regulator closing the valve against the orifice to turn off the gas within the gas regulator. In certain embodiments, the use of pressure stored in a carbon dioxide cylinder would actuate a piston added to the regulator valve stein to turn off the gas at the regulator orifice.

In still further embodiments, the gas regulating and control system may be configured to be positioned between a regulator body of the gas regulator and an operating head of the regulator without significant piping changes.

In some embodiments, presence of the gas regulating and control system may not interfere with pressure and flow controlling performance of the regulator.

Further embodiments of the present inventive concept provide a gas control module including a plurality of sensors associated with a gas regulator, the plurality of sensors configured to sense a corresponding plurality of parameters associated with the gas regulator; and a communications circuit configured to transmit signals to and receive signals from a location remote from the gas regulator. The gas control module may be further configured to shut off gas within the gas regulator responsive to a shut off signal from the location remote from the gas regulator and/or wherein the gas control module is configured to automatically turn off the gas within the gas regulator when one or more of the corresponding plurality sensed parameters is determined to be outside an acceptable range for the sensed parameter.

Still further embodiments of the present inventive concept provide methods for remotely controlling gas flow within a gas regulator, the method including sensing a plurality of parameters associated with the gas regulator using a plurality of corresponding sensors associated with the gas regulator; determining if a shut off signal has been received from a location remote from the gas regulator or if one or more of the plurality sensed parameters is outside an acceptable range for the sensed parameter; and shutting off the gas within the gas regulator if it is determined that the shut off signal has been received and/or one of the plurality of sensed parameters is outside the acceptable range.

DETAILED DESCRIPTION

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed in the background, conventional methods for remotely controlling a gas service flow need improvement. Accordingly, embodiments of the present inventive concept provide a gas shutoff mechanism that can be added to an existing service regulator without any significant piping modifications. Furthermore, embodiments of the present inventive concept allow monitoring of the upstream supply pressure and downstream delivery pressure using, for example, integral sensors of the shutoff device, due to access to the inside of the regulator as will be discussed further below with respect to the figures.

As used herein, a "gas regulating and control system" refers to one or more elements associated with a gas regulator that allows gas to be turned on/and off from a remote location. Although embodiments of the present inventive concept are discussed herein with respect to remote "shutoff," embodiments of the present inventive concept are not limited to this configuration. Gas can be turned on remotely as well; however, there may be safety concerns with doing so in certain situations. Furthermore, although embodiments of the present inventive concept are discussed with respect to gas regulators, embodiments may be used with respect to other types of regulators where appropriate without departing from the scope of the present inventive concept.

Figure 1:
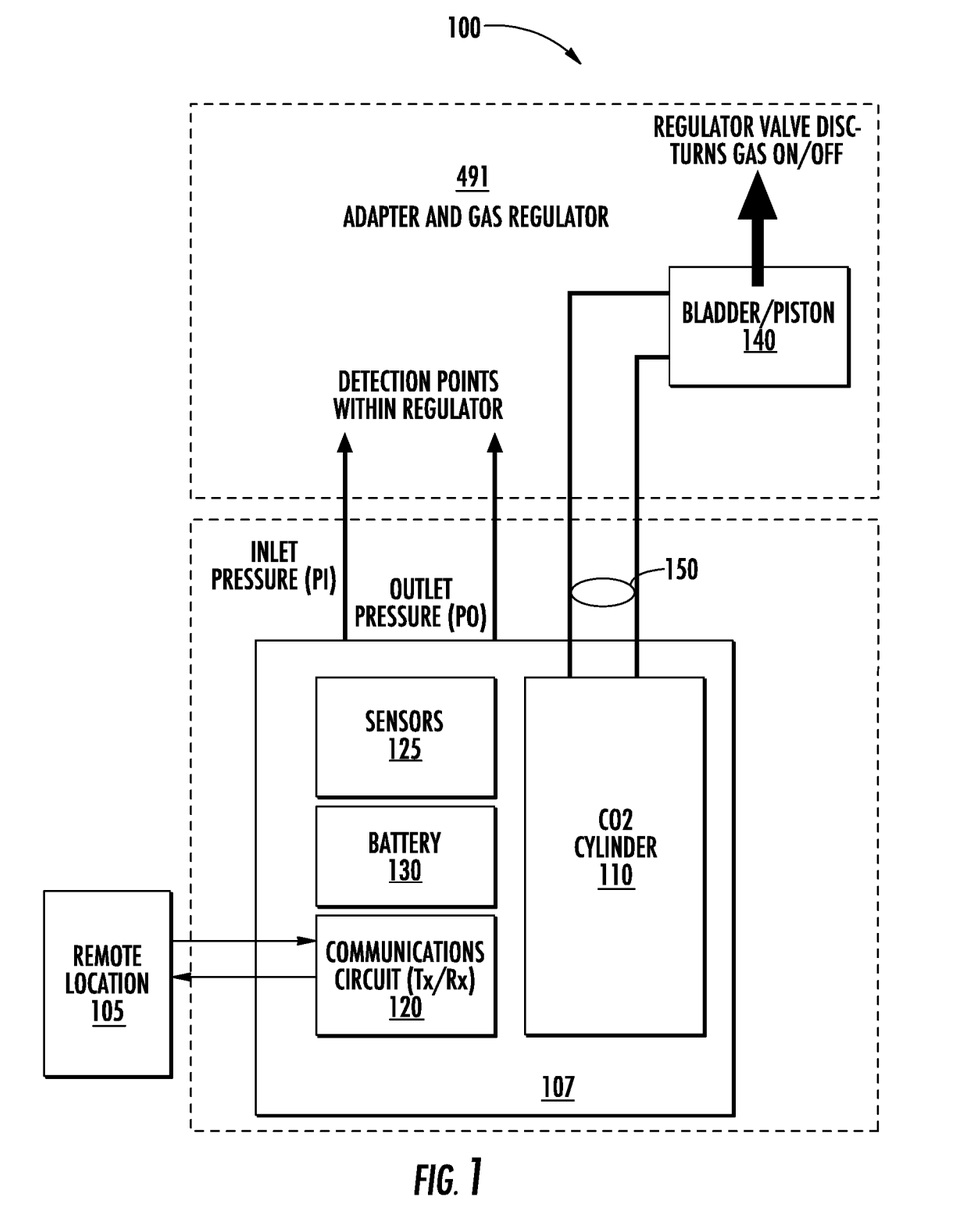
FIG. 1 is a basic block diagram of a gas regulating and control system in accordance; with some embodiments of the present inventive concept.

Referring now to FIG. 1, a gas regulating and control module system 100 in accordance with some embodiments of the present inventive concept will be discussed. The gas regulating and control system 100 illustrated in FIG. 1 may be provided between an existing/installed service regulator body and a detachable diaphragm/head assembly. For example, the gas regulating system 100 may be positioned on the maintenance/service joint between the regulator operating head and the piped-in regulator body as will be discussed further below. Problems with prior solutions for remote shutoff are addressed by embodiments of the present concept. For example, the gas regulating system 100 may not need substantial piping set changes and may enable monitoring of various parameters associated with the gas regulator, for example, pressures inside the pipe, supply pressure and delivery pressure downstream of the regulator.

As illustrated in FIG. 1, in some embodiments, the gas regulating system 100 includes a gas control module 107 including a communications circuit (Tx/Rx) 120, a carbon dioxide ($CO_2$) cylinder 110, a battery 130 and various sensors 125 configured to sense at least inlet and outlet pressure. The gas control module 107 is coupled to a remote location 105 including a processor and configured to communicate with the gas regulating system 100. However, other parameters, such as temperature, vibration and the like, may be monitored without departing from the present inventive concept. The communications circuit 120 may be used to provide information related to the parameters measured by the sensors 125 and may receive instructions to shut off the gas based on the measured parameters. Thus, the gas shutoff action can be controlled remotely using, for example, radio signals. In further embodiments, the gas shutoff may occur automatically responsive to a sensed parameter that is outside normal limits. In particular, a parameter, for example, pressure, temperature, or vibration, may be sensed and these readings may be, compared with stored limits that are acceptable for the particular meter. If a particular limit is determined to have been exceeded, pressure stored in a $CO_2$ cylinder (cartridge) 110 may be used to power the gas shutoff valve actuation. For example, as illustrated in FIG. 1 the $CO_2$ pressure could be used to fill a bladder 140 inserted under the diaphragm coupling of the regulator, thus, lifting a lever assembly of the regulator, overcoming the spring force and closing the regulator's valve disc against the orifice seat to shut off the gas.

It will be understood that embodiments of the present inventive concept are not limited to the configuration using the bladder 140 as discussed above. For example, in some embodiments, a piston 140 may be used. In particular, the $CO_2$ pressure could be used to actuate the piston 140 added to the regulator valve stem to turn off the gas at the regulator orifice.

As further illustrated in FIG. 1, the $CO_2$ cylinder is coupled to the bladder piston 140 through a fill valve and a vent valve 150. The valves 150 may be, for example, board mounted air switches, miniature electronic valves, micro solenoids, piezo actuated, or small direct current (DC) motor powered air valves, using the battery 130 without departing from the scope of the present inventive concept.

It will be understood that although embodiments of the present inventive concept are illustrated as having a $CO_2$ cylinder, embodiments of the present inventive concept are not limited to this configuration. Other methods of actuating the bladder/piston 140 may be used without departing from the scope of the present inventive concept.

In further embodiments, a pneumatic, o-ring sealed, piston within the added stem extension for the regulator valve disc may be used to shut off the gas responsive to the sensed parameter. The gas regulating system in accordance with any embodiments of the present inventive concept discussed herein, when not actuated, will not interfere with the pressure and flow controlling performance of the regulator.

Embodiments of the present inventive concept may provide both automatic gas shut off and gas shut off responsive to a signal provided from a remote location. For example, in some embodiments, when sensed parameters are outside of acceptable limits, the gas may be shut off automatically for safety purposes. However, in a situation where a customer's gas is being shut off for non-payment, a signal may be sent from the remote location 105 to the communications circuit 120 of the gas regulating system and the gas may be shut off responsive thereto.

Thus, in accordance with embodiments discussed herein the gas can be shut off and/or turned on remotely by, for example, radio or locally by pressure, temperature, or vibration sensed readings compared with firmware limits/thresholds. Remote gas shutoff capability at or near the point of end use is a desired feature by gas service supply utilities, both for enhanced safety as well as for deterrence of non-payment. As discussed above, gas shutoff devices available to date, generally require significant modification of the service supply piping for a standalone shutoff, or the change-out of the gas meter or gas regulator to another with an integral shutoff. It is desirable by the gas utility not to have to break into the existing piping or not to install a complete new component, in order to gain shutoff capability. Regulators are commonly included as an existing component of a gas utility's service piping set for each end user. Thus, embodiments of the present inventive concept provide a gas regulating system that provides a gas shutoff function to complement the existing service regulator without any significant piping modifications. Some embodiments also allow monitoring of both the upstream supply pressure and downstream delivery pressure using integral sensors of the shutoff device, since the access to the inside of the regulator is provided.

Figure 2A:
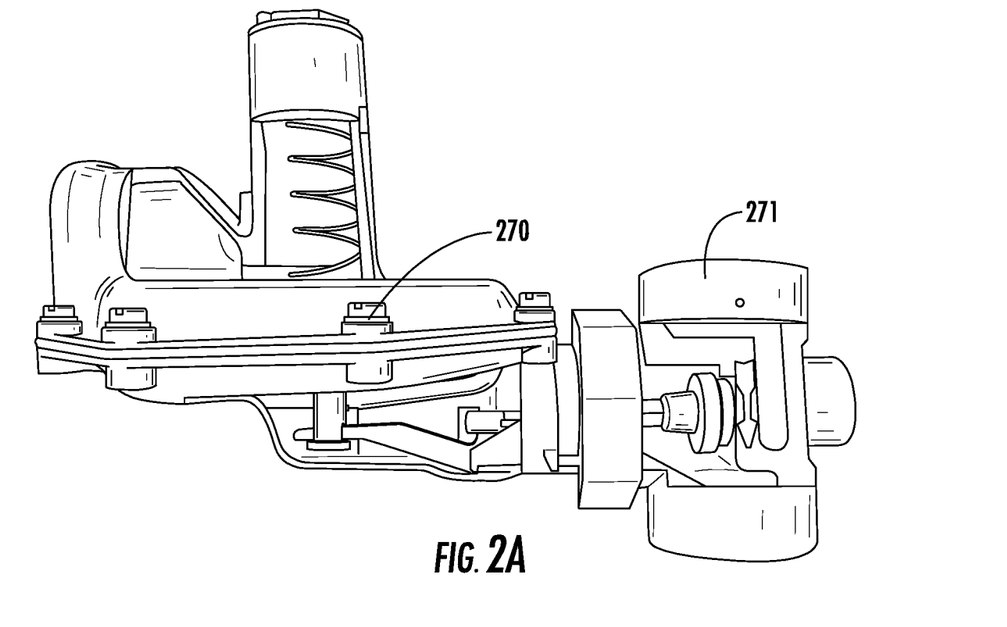
FIGS. 2A and 2B are diagrams illustrating a regulator body and operating head connected by a maintenance/service joint in a standard system.
Figure 2B:
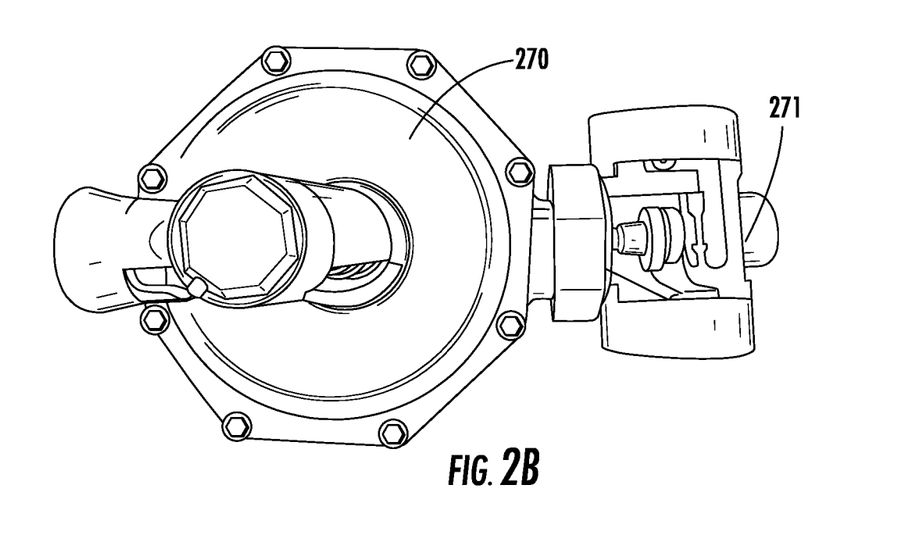

Referring now to FIGS. 2A through 9, positioning of the gas regulating system in accordance with some embodiments of the present inventive concept will be discussed it will be understood that the figured discussed herein are provided for example only showing both external and some internal features for representation and are not intended to limit the scope of the present inventive concept. FIGS. 2A and 2B are diagrams illustrating a regulator body 271 and operating head 270 connected by a maintenance/service joint in a standard system. Thus, as discussed below the gas regulating system 100 (FIG. 1) in accordance with embodiments discussed herein may be positioned between the regulator operating head 270 and the piped-in regulator body 271.

Figure 3A:
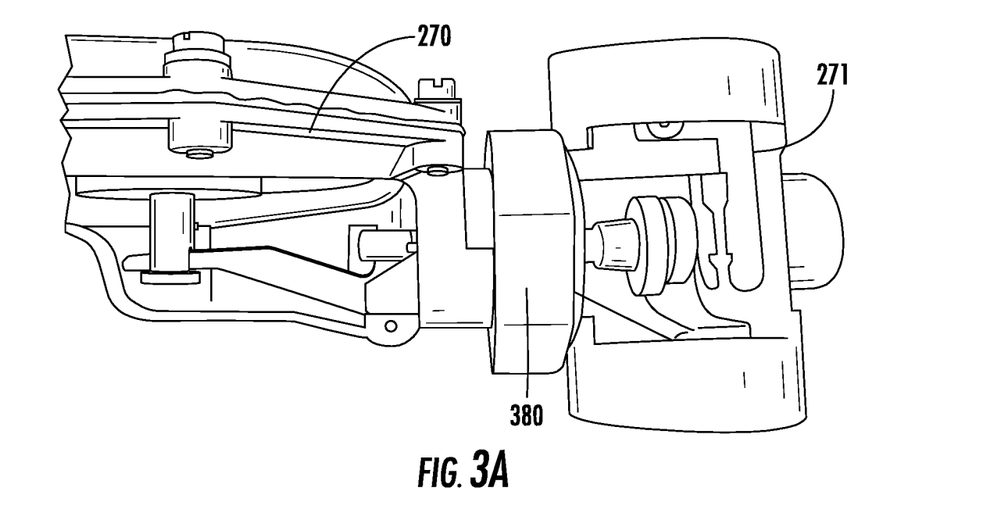
FIGS. 3A and 3B diagrams illustrating a regulator body with pipes, and an operating head disconnected by a maintenance/service joint in a standard system.
Figure 3B:
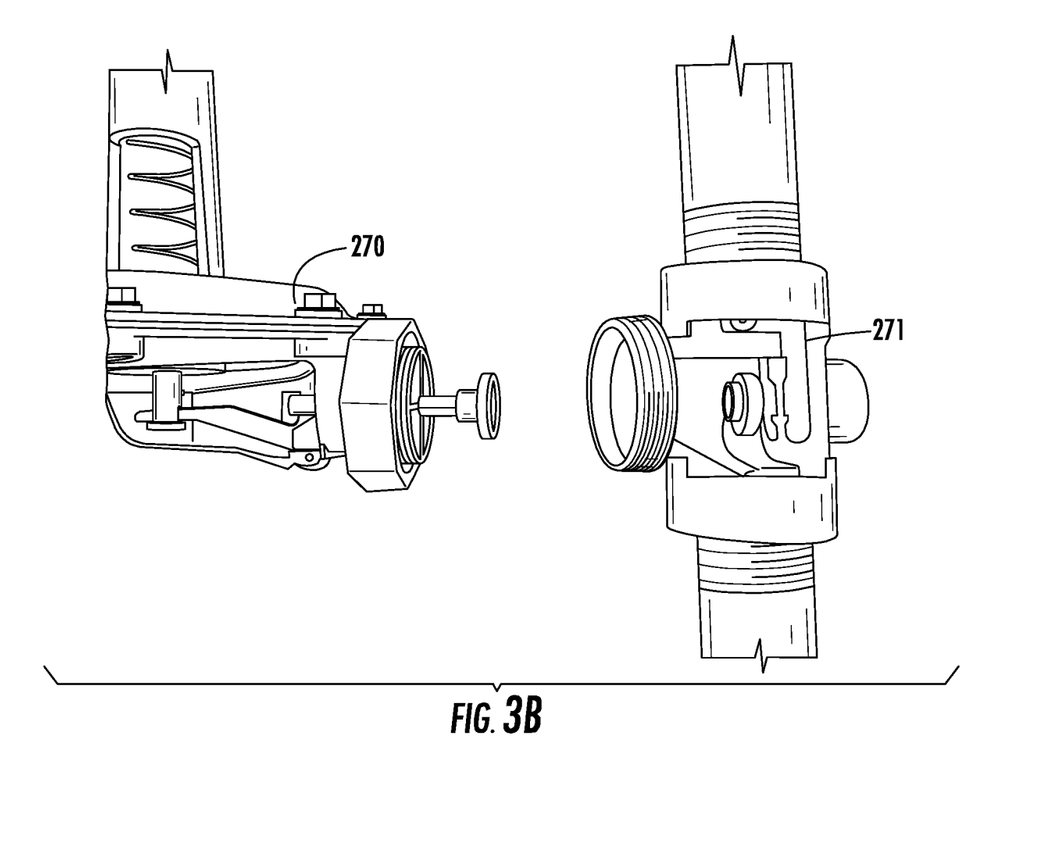

FIG. 3A is a diagram illustrating the connection between the regulator body 271 and the operating head at the service joint 380. As illustrated in FIG. 3B, the operating head 270 of a regulator can be removed and the body 271 remains piped in. It will be understood that, for safety reasons, gas should be shut off before the operating head 270 is removed. Removal of the operating head 270 allows ease of inspection, maintenance, component replacement and the like for the regulator. Furthermore, at this point, orientation of the operating head 270 can be changed.

Once the operating head 270 is removed, a location for a gas regulating system 100 (FIG. 1) in accordance with embodiments discussed herein is created that does not require significant pipe changes and allows access to internal points for monitoring of inlet and outlet pressures.

Figure 4:
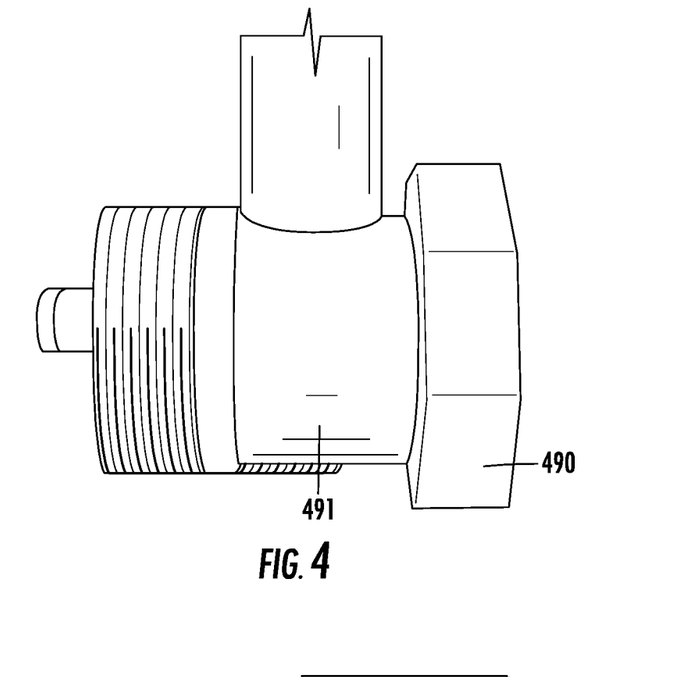
FIG. 4 is a diagram of an adapter for use in connecting a gas regulating system in accordance with some embodiments of the present inventive concept.
Figure 5:
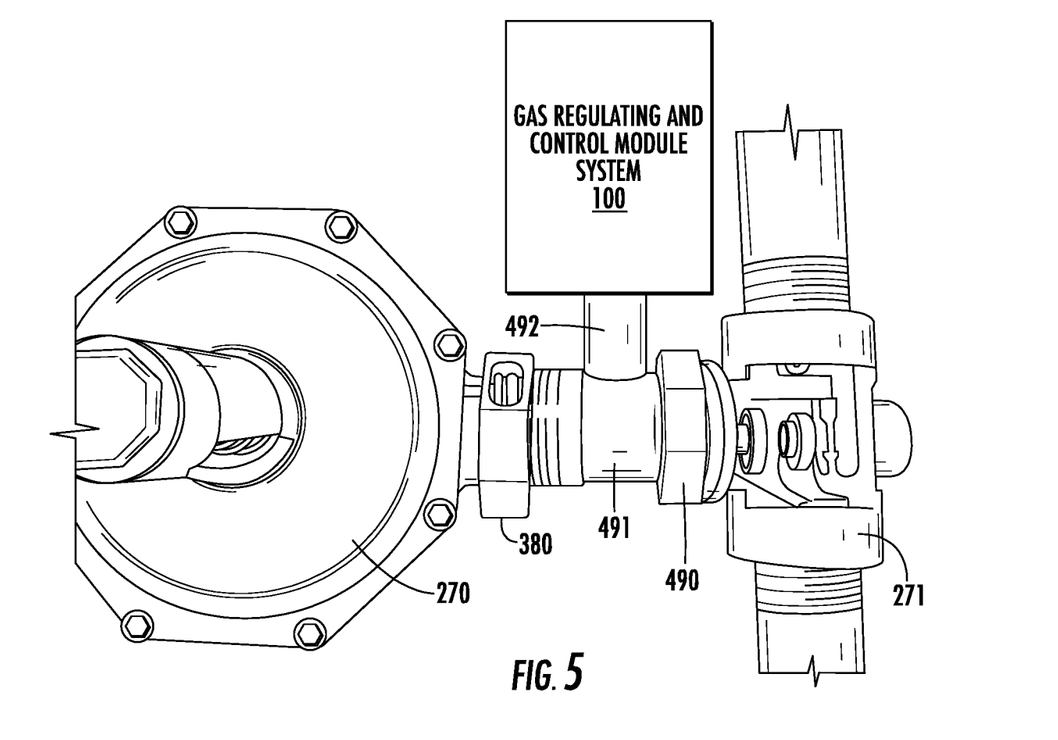
FIG. 5 is a diagram illustrating a gas regulating and control system connected in accordance with some embodiments of the present inventive concept.

In some embodiments, a gas regulating system adapter 491 with connector 490, as illustrated in FIG. 4, may be positioned between the regulator body 271 and the operating head 270 that allows a third connection 492 to the gas regulating and control module system 100 as illustrated in FIG. 5.

As illustrated in FIG. 5, the gas regulating system 100 can be positioned between the regulator body 271 and the operating head 270 using the adapter 491 with connector 490. Similar to conventional connections, the new adapter 491 and connector 490 would need the same connecting fittings and seals as the regulator service joint 380.

Figure 6:
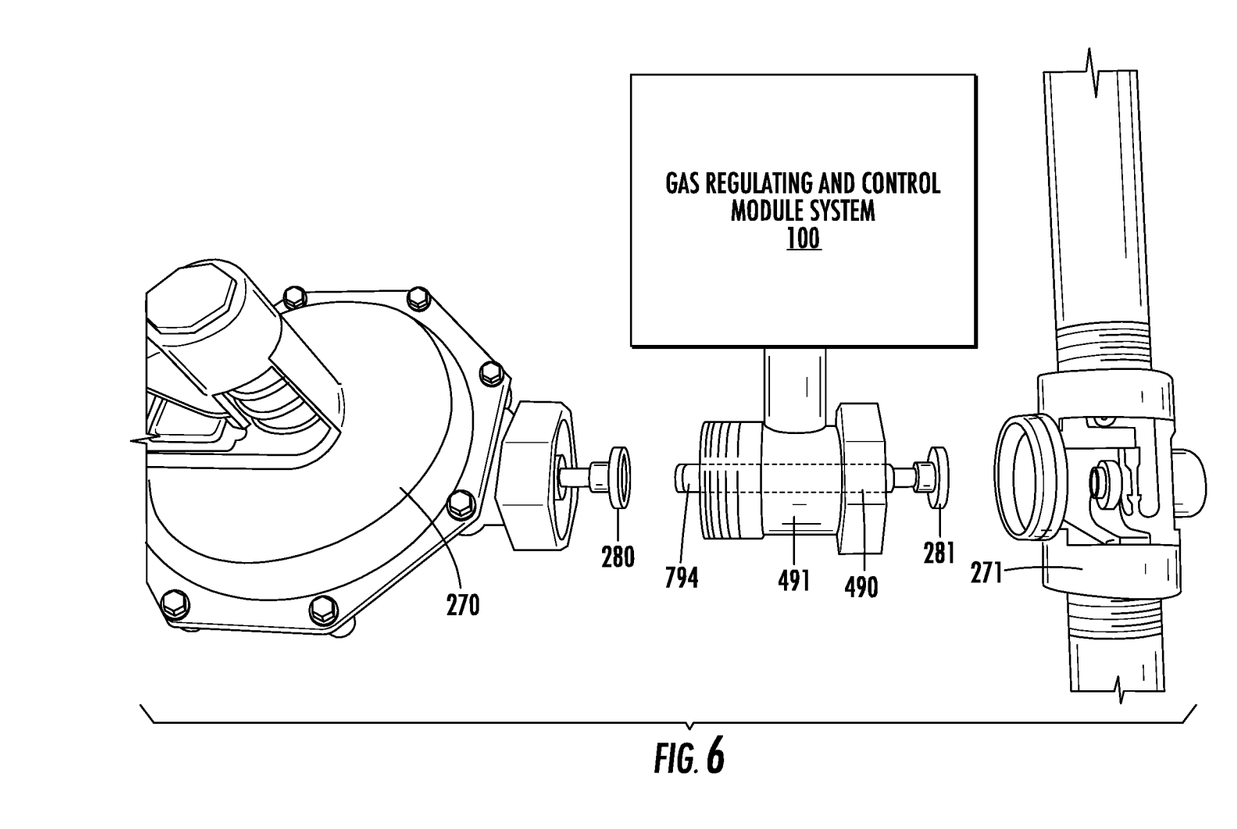
FIG. 6 is a diagram illustrating separated portions of the gas regulating and control system it accordance with some embodiments of the present inventive concept.

FIG. 6 illustrates the three portions of the system, the regulator body 271, the adapter 491 with connector 490/system 100, and the operating head 270 separated from one another. In some embodiments, as illustrated, for example, in FIGS. 6 and 7A, the existing valve pad 280 may be removed from the regulator stem to be (re-used or discarded). A stem-extension 795, within the adapter, connects in place of the existing valve pad, (with connector 794), and then the adapter connects to the regulator head, and then to the regulator body. A new valve pad 281 is shown in FIG. 6.

Figure 7A:
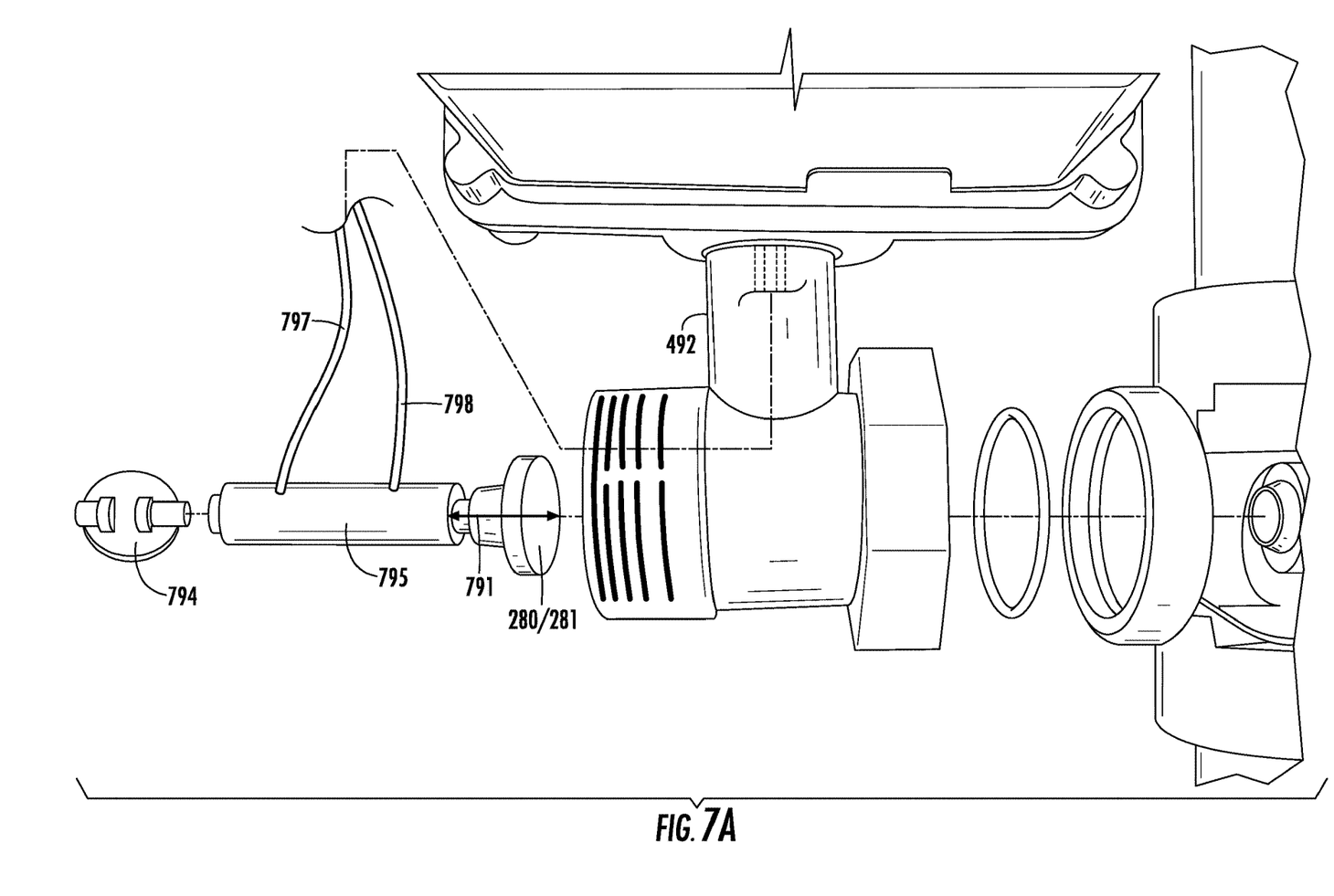
FIG. 7A is a more detailed diagram illustrating connections of the gas regulating and control system in accordance with some embodiments of the present inventive concept.
Figure 7B:
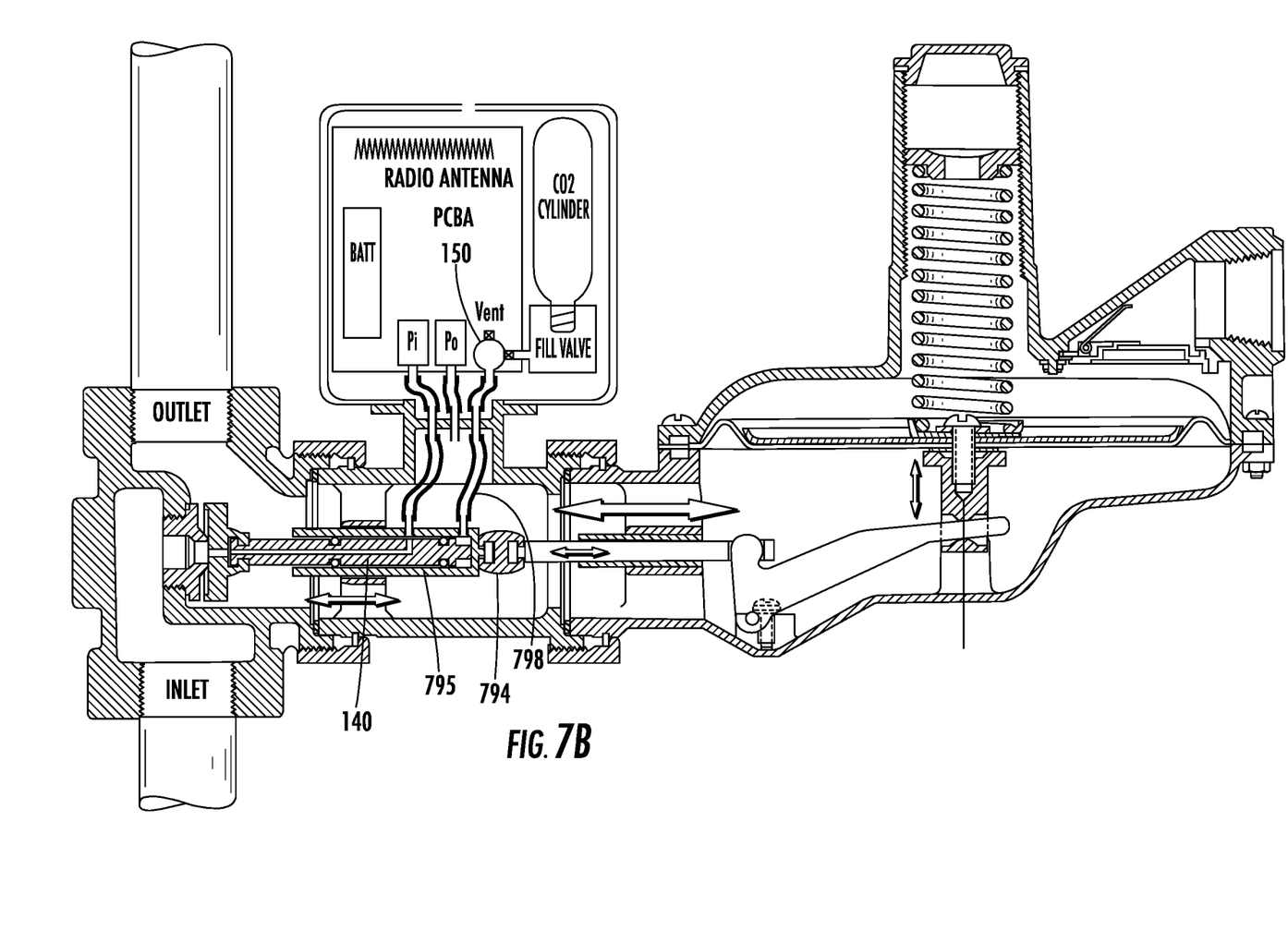
FIGS. 7B and 7C are detailed drawings for the piston and the bladder actuated embodiments, respectively, in accordance with some embodiments of the present inventive concept.
Figure 7C:
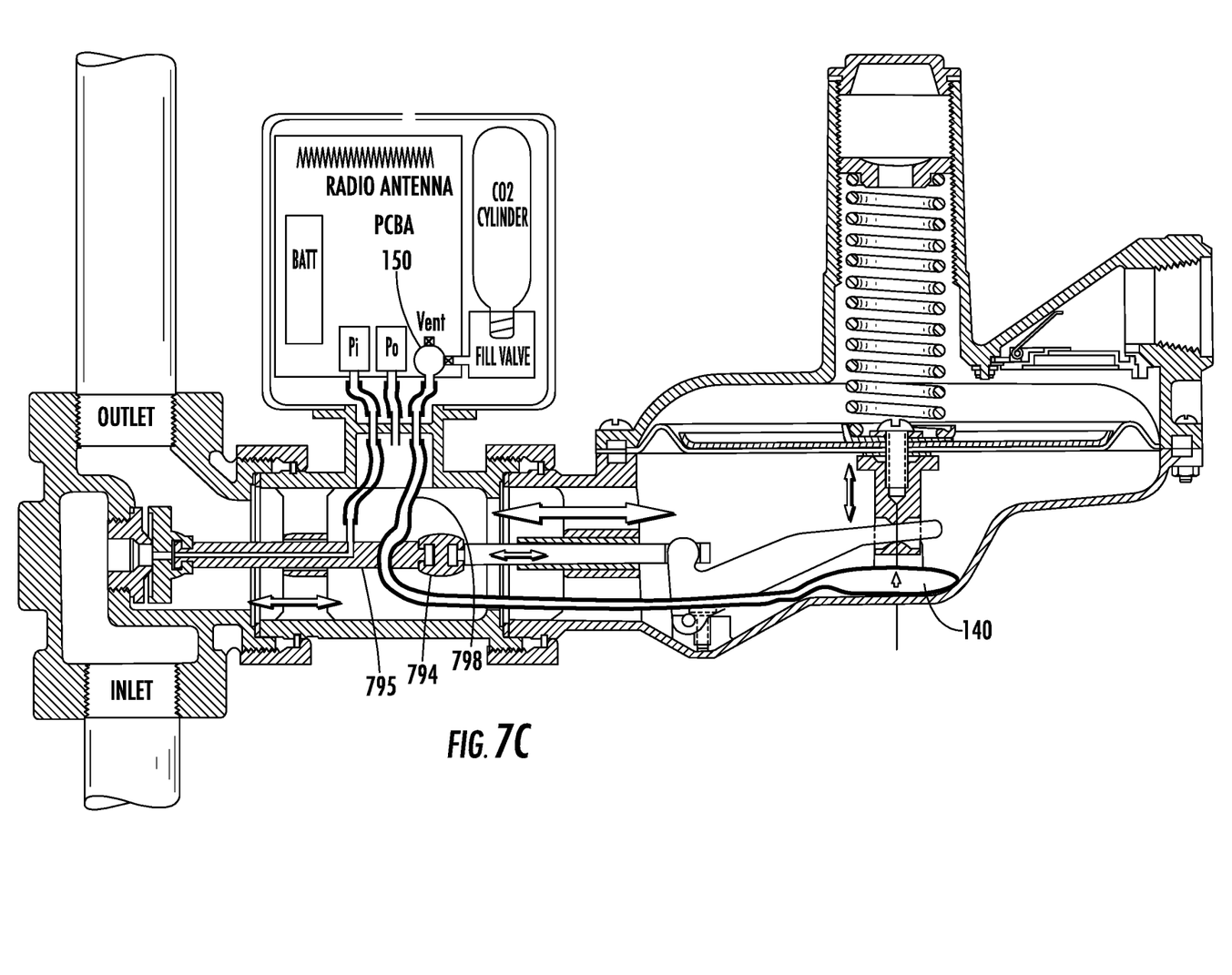

FIG. 7A illustrates an example of the system in accordance with embodiments discussed herein where the stem-extension 795 is shown at the left, (outside the adapter for clarity), and connected in place of the regulator valve pad. A new or re-used valve pad may be on the stem-extension. The stem-extension 795 may be extended even further, (arrow 791), when needed to perform the gas shut off function, thus, pressing against the existing orifice in the regulator body. The shut off action may be provided by, for example, a piston incorporated within the stem-extension in some embodiments.

As discussed above, in some embodiments, the piston may be charged from a $CO_2$ cylinder or with an air pump located in the gas regulating system 100. In further embodiments, a motor could be contained within the stem-extension 795 and may be energized to create the gas shut off. The two flexible lines 797, 798, connected to the stem-extension 795, may be contained and sealed within the neck, 492 (FIG. 7A), between the shutoff adapter and the gas regulating and control module 107 (FIG. 1). A first of the two lines 798 could either be, for example, a hose to supply $CO_2$ or air pressure to the stem-extension piston 140 (FIG. 7B) or to the air bladder 140 (FIG. 7C), or it may be a wiring cable supplying electrical current to the stem-extension motor. A second of the two lines 797 may be an optional hose for detecting the upstream or inlet supply pressure to the regulator. This supply or inlet pressure could be communicated through a center hole in the stem extension and continuing through a center hole of a new valve pad, or this hose may be connected directly to the side of a new valve pad, either of which contains the communication port for the inlet pressure on the face of the valve pad aligned with the through-hole of the orifice. Both inlet and outlet pressures, (Pi and Po respectively), could be sensed within the gas regulating and control module 107 at sensors 125 (FIG. 1).

In some embodiments, the stem-extension piston allows maximum stem extension and valve pad movement during shutoff. Thus, after a shutoff and with sufficient added loading pressure as necessary within the stem-extension piston this technique may keep the valve pad closed against the orifice. The stem extension piston would brace against the regulator diaphragm via the connecting linkage, whether the diaphragm is suspended by outlet pressure or has been pushed by the spring to its lowest position against the case.

Measuring the inlet and outlet pressures (and potentially the $CO_2$ loading pressure as well) could allow for just enough force to be generated within the stem-extension piston to keep the gas shut off without exceeding the valve pad cut strength.

As discussed above, some embodiments of the present inventive concept monitor outlet pressure, which enables alarms and gas shut off limits to be locally acted upon automatically and remotely communicated. A rapid drop in outlet pressure could be detected as a line break and the shutoff could act as an excess flow valve safety device. For example, analyzing the changes of patterns of outlet pressures over time especially during normal regulation events, could be used to detect accelerating wear or dirt build up and call for service prior to a failure. Furthermore, increased outlet pressure could be recognized as a valve blockage, valve pad damage, or regulator malfunction, triggering an alarm for regulator maintenance cleaning, repair service or replacement.

In some embodiments, the end of the stem-extension 795, behind the valve pad, may have hard rubber or soft metal properties and may be contoured or tapered to allow for emergency shutoff of gas within the orifice lip or throat in the event of valve disc cutting, or missing, or being damaged by debris. The extra-long travel of the stem-extension piston may allow for such an emergency shutoff.

In some embodiments, a controlled vent valve for loading pressure relief 150 (FIG. 1) or 150 (FIG. 7B) can be used, such as for turning the gas flow back on. As discussed above, the loading pressure line to the stem-extension piston or bladder may have both an electronic controlled inlet/fill valve as well as a pressure venting relief valve. This may allow both for the piston/bladder to be activated for shut off or deactivated for re-opening and restoring gas service. Upon venting of the loading pressure, the normal regulator action will push the piston or bladder back into its normal retracted position. Low power consumption and tiny shape-memory-alloy-driven valves are now economically available to actuate valves such as for the loading pressure and vent lines. In some embodiments, shape memory alloy (SMA) actuators used in simple peristaltic pumps may be used directly to actuate the stem-extension (in place of a piston) or to lift the diaphragm (in place of a bladder).

Figure 8:
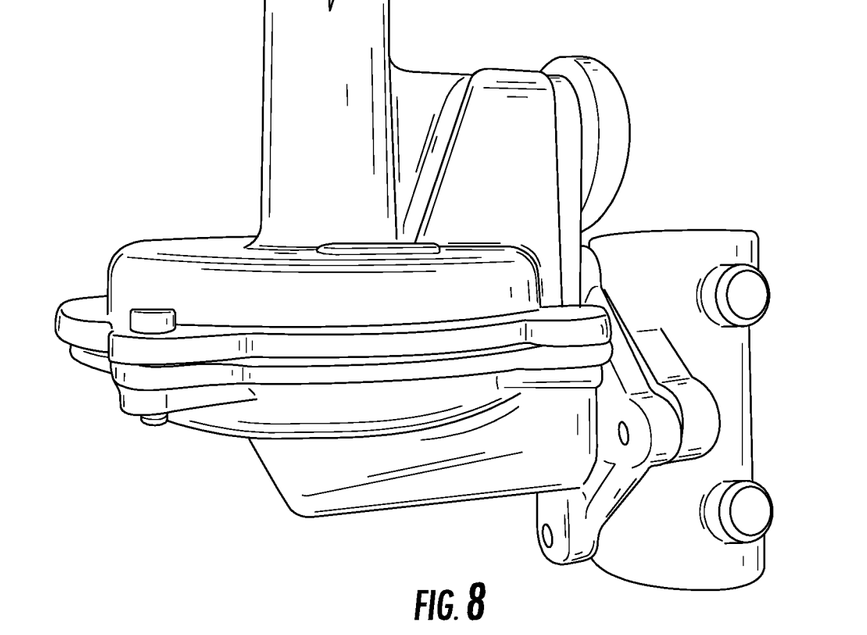
FIGS. 8 and 9 are diagrams of further regulators with a gas regulating and control system in accordance with some embodiments of the present inventive concept.
Figure 9:
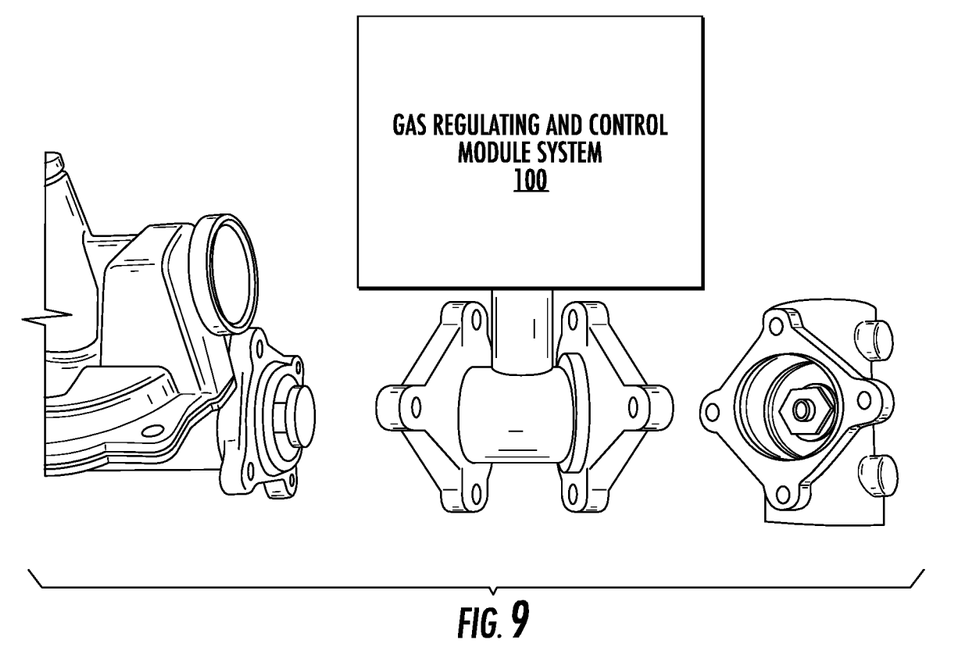

Although embodiments of the present inventive concept are illustrated with respect to a particular regulator form in FIGS. 2A through 7, embodiments of the present inventive concept are not limited to this configuration. Other service regulators may have alternative coupling connection arrangements between the body and operating head without departing from the scope of the present inventive concept. FIGS. 8 and 9 illustrate an alternative regulator form using a gas regulating system 100 in accordance with embodiments discussed herein.

Figure 10:
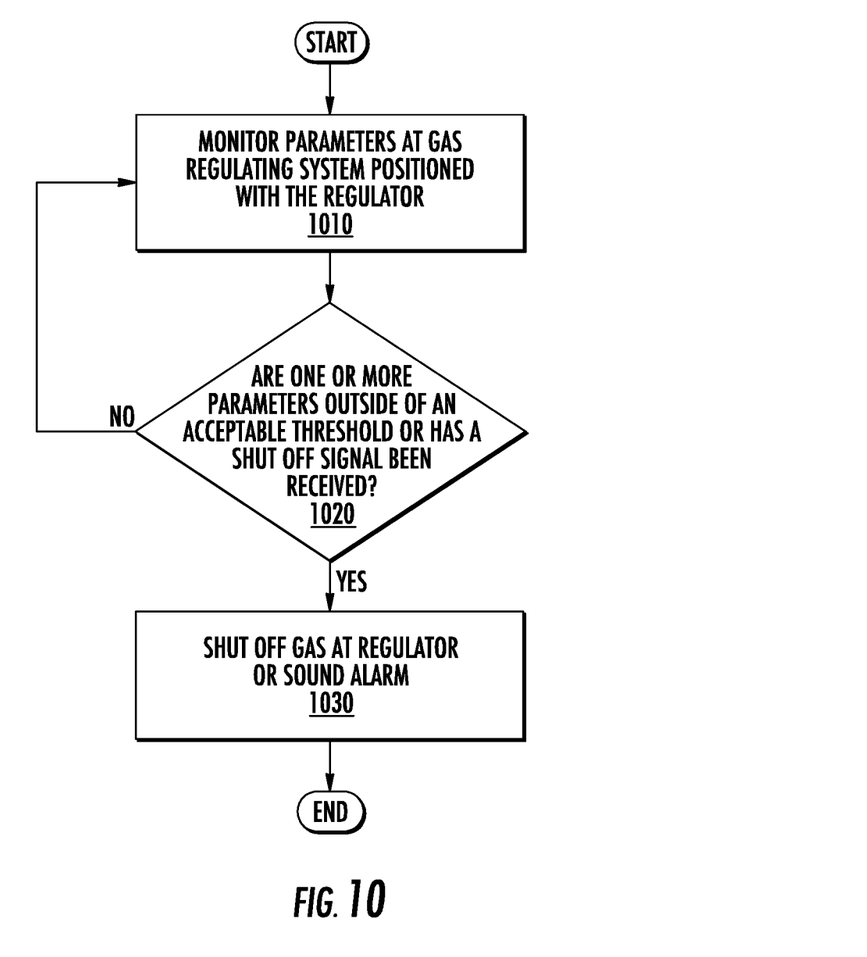
FIG. 10 is a flowchart illustrating operations for remotely controlling gas flow in accordance with some embodiments of the present inventive concept.

Referring now to the flowchart of FIG. 10, operations for shutting off gas remotely in accordance with embodiments of the present inventive concept will be discussed. Operations begin at block 1010 by monitoring parameters at a gas regulator using sensors in a gas regulating system in accordance with embodiments discussed herein. The sensors may monitor, for example, inlet and outlet pressure, vibration, temperature, etc. The monitored parameters are routinely compared to reference parameters stored in the system. An alarm is determined if one or more parameters are outside an acceptable range for that particular parameter (block 1020). Alternately, if it is determined that all parameters are not outside the acceptable range (and that a signal has not been received from a remote location)(block 1020), operations return to block 1010 and repeat until parameters are found to be outside of acceptable range or a signal is received. If it is determined that one or more parameters are outside of acceptable limits or a signal has been received, the gas may be shut off at the regulator or an alarm may be sounded (block 1030). For example, if it is determined that the outlet pressure is outside an acceptable threshold, this could be an indication of a valve blockage, valve pad damage, or regulator malfunctions. In this case, an alarm may be triggered for regulator maintenance cleaning, repair service or replacement.

Figure 11:
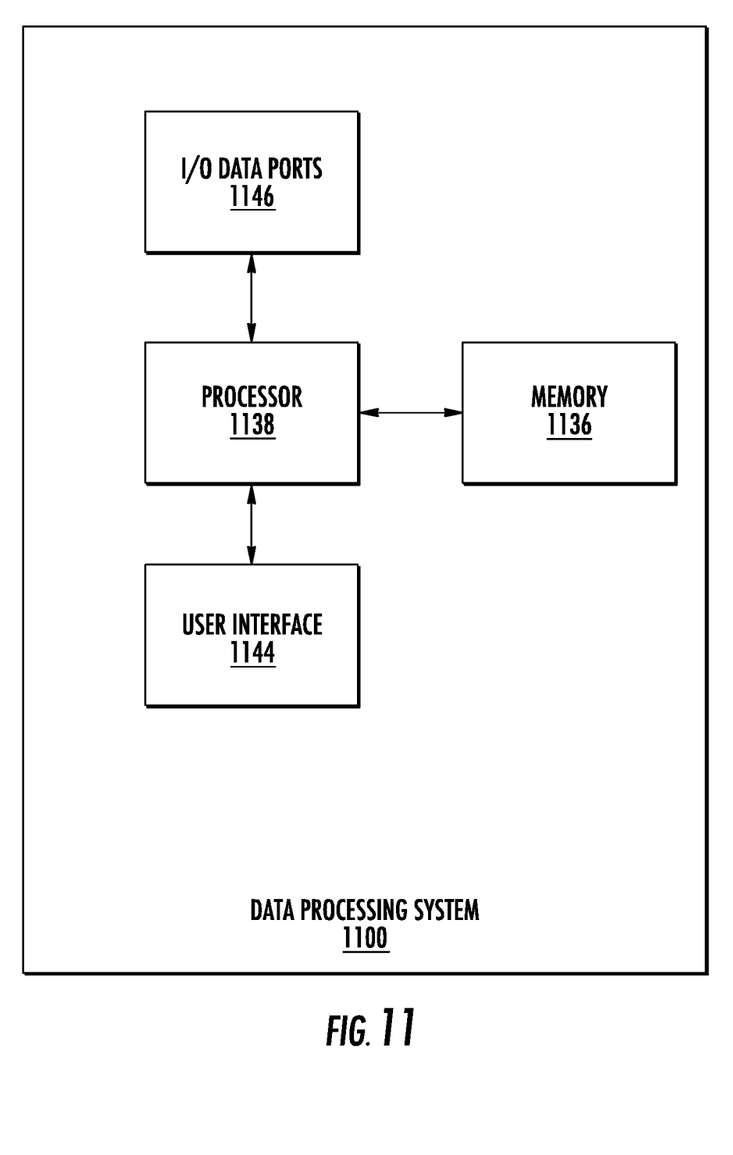
FIG. 11 is a block diagram illustrating a data processing system in accordance with some embodiments of the present inventive concept.

Referring now to FIG. 11, an example embodiment of a data processing system 1100 suitable for use in accordance with some embodiments of the present inventive concept will be discussed. For example, the data processing system 1100 may be provided at the remote location, at the gas regulating system or both without departing from the scope of the present inventive concept. As illustrated in FIG. 11, the data processing system 1100 includes a user interface 1144 such as a display, a keyboard, keypad, touchpad or the like, I/O data ports 1146 and a memory 1136 that communicates with a processor 1138. The I/O data ports 1146 can be used to transfer information between the data processing system 1100 and another computer system or a network. These components may be conventional components, such as those used in many conventional data processing systems, which may be configured to operate as described herein. This data processing system 1100 may be included in any type of computing device without departing from the scope of the present inventive concept.

As briefly discussed above, embodiments of the present inventive concept provide a gas regulating and control system that allows remote monitoring and control of gas regulators. As discussed, the gas regulating system discussed here may not require significant piping changes and may allow pressures to be monitored, which is an improvement over conventional systems.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), microcontroller or graphics processing unit.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A gas regulating system configured to be received at a gas regulator installed at a remote location for remotely controlling the gas regulator, the system comprising:
   a gas control module including a plurality of sensors associated with the gas regulator, the plurality of sensors configured to sense a corresponding plurality of parameters associated with the gas regulator,
   wherein the gas control module is configured to:
      automatically turn off a flow of gas within the gas regulator when one or more of the corresponding plurality of sensed parameters is determined to be outside an acceptable range for the one or more of the corresponding plurality of sensed parameters; and
      determine if one or more of the corresponding plurality of sensed parameters is outside the acceptable range for the sensed parameter and if it is determined that the one or more parameters is outside the acceptable range, use pressure stored in a carbon dioxide cylinder to one of fill a bladder and actuate a lever assembly of the regulator to turn off the flow of gas within the gas regulator and fill a piston that extends a valve disc against an orifice of the gas regulator to turn off the flow of gas within the gas regulator.

2. The system of claim 1, wherein the gas control module further comprises a communications circuit configured to transmit signals to and receive signals from a remote location and wherein the gas control module is further configured to shut off the flow of gas within the gas regulator responsive to a shut off signal from the remote location.

3. The system of claim 2, wherein the gas control module is further configured to turn on the flow f gas within the gas regulator responsive to a turn on signal from the remote location.

4. The system of claim 1, wherein the corresponding plurality of sensed parameters comprise pressure inside a pipe, supply pressure, delivery pressure, temperature, vibrations and any combination thereof.

5. The system of claim 1, wherein the gas regulating system is configured to be positioned between a regulator body of the gas regulator and an operating head a of the regulator body.

6. The system of claim 1, wherein presence of the gas regulating system does not interfere with pressure and flow controlling performance of the regulator.

7. A gas control module comprising:
a plurality of sensors associated with a gas regulator, the plurality of sensors configured to sense a corresponding plurality of parameters associated with the gas regulator; and
a communications circuit configured to transmit signals to and receive signals from a location remote from the gas regulator,
wherein the gas control module is further configured to;
shut off a flow of gas within the gas regulator responsive to a shut off signal from the location remote from the gas regulator and/or wherein the gas control module is configured to automatically turn off the flow of gas within the gas regulator when one or more of the corresponding plurality of sensed parameters is determined to be outside an acceptable range for the one or more of the corresponding plurality of sensed parameters; and
determine if one or more of the corresponding plurality of sensed parameters is outside the acceptable range for the sensed parameter and if it is determined that the one or more parameters is outside the acceptable range, use pressure stored in a carbon dioxide cylinder to one of fill a bladder and actuate a lever assembly of the regulator to turn off the flow of gas within the as regulator and fill a piston that extends a valve disc against an orifice of the gas regulator to turn off the flow of gas within the gas regulator.

8. The module of claim 7, wherein the gas control module is further configured to turn on the flow of gas within the gas regulator responsive to a turn on signal from the location remote from the gas regulator.

9. The module of claim 7, wherein the corresponding plurality of sensed parameters comprise pressure inside a pipe, supply pressure, delivery pressure, temperature, vibrations and any combination thereof.

10. The module of claim 7, wherein the gas control module is part of a gas regulating system that is configured to be positioned between a regulator body of the gas a regulator and an operating head of the regulator body.

11. A method for remotely controlling the flow of gas to a gas regulator, the method comprising:
sensing a plurality of parameters associated with the gas regulator using a plurality of corresponding sensors associated with the gas regulator;
determining if a shut off signal has been received from a location remote from the gas regulator or if one or more of the plurality sensed parameters is outside an acceptable range for the sensed parameter;
shutting off the flow of gas within the gas regulator if it is determined that the shut off signal has been received and/or one of the plurality of sensed parameters is outside the acceptable range; and
if it is determined that the one or more of the plurality of sensed parameters is outside the acceptable range, using pressure stored in a carbon dioxide cylinder to one of fill a bladder and actuate a lever assembly of the regulator to turn off the flow of gas within the gas regulator and fill a piston that extends a valve disc against an orifice of the gas regulator to turn off the flow of gas within the gas regulator.

12. The method of claim 11, further comprising:
receiving a turn on signal from the location remote from the gas regulator; and
turning on the flow of gas within the gas regulator responsive to the turn on signal from the location remote from the gas regulator.

13. The method of claim 11, wherein the plurality of sensed parameters comprise pressure inside a pipe, supply pressure, delivery pressure, temperature, vibrations and any combination thereof.

* * * * *

UNITED STATES PATENT AND TRADEMARK OFFICE
CERTIFICATE OF CORRECTION

PATENT NO. : 10,908,623 B2  
APPLICATION NO. : 16/378793  
DATED : February 2, 2021  
INVENTOR(S) : Daniel W. Peace Page 1 of 1

It is certified that error appears in the above-identified patent and that said Letters Patent is hereby corrected as shown below:

In the Claims

Column 11, Claim 3, Line 4: Please correct "turn on the flow f gas"
    to read -- turn on the flow of gas --
  Claim 5, Line 13: Please correct "operating head a of"
    to read -- operating head of --
  Claim 7, Line 43: Please correct "within the as regulator"
    to read -- within the gas regulator --

Column 12, Claim 10, Line 11: Please correct "of the gas a"
    to read -- of the gas --

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*